(12) United States Patent
Koch

(10) Patent No.: US 6,178,608 B1
(45) Date of Patent: Jan. 30, 2001

(54) ROTARY TRANSFER MACHINE

(75) Inventor: Loyd L. Koch, Rockford, IL (US)

(73) Assignee: Bourn & Koch Machine Tool Co., Rockford, IL (US)

( * ) Notice: Under 35 U.S.C. 154(b), the term of this patent shall be extended for 0 days.

(21) Appl. No.: 09/277,563

(22) Filed: Mar. 26, 1999

(51) Int. Cl.$^7$ ................................ B23Q 7/14; B23B 3/00
(52) U.S. Cl. ................................ 29/33 P; 29/563; 29/564
(58) Field of Search .................. 29/33 P, 563, 29/564, 38 C, 38 B, 787, 792, 561, 48.5; 198/345.3, 345.2; 33/569

(56) References Cited

U.S. PATENT DOCUMENTS

| | | | |
|---|---|---|---|
| Re. 35,481 | * | 3/1997 | Wioskowski et al. ............ 29/563 |
| 3,739,688 | * | 6/1973 | Bell et al. ............ 29/561 X |
| 3,846,912 | * | 11/1974 | Newbould ............ 33/569 X |
| 3,895,424 | * | 7/1975 | Hautau ............ 29/563 X |
| 4,163,313 | * | 8/1979 | Matsuno et al. ............ 29/563 |
| 4,184,236 | * | 1/1980 | Nutt ............ 29/792 X |
| 4,473,930 | * | 10/1984 | Bezner et al. ............ 29/38 C |
| 4,480,738 | * | 11/1984 | Mattson ............ 29/33 P |
| 4,570,782 | * | 2/1986 | Cargill et al. ............ 198/345.3 |
| 4,751,361 | * | 6/1988 | Inove et al. ............ 29/564 X |
| 5,261,147 | * | 11/1993 | Wood, III ............ 29/33 P |
| 5,452,502 | * | 9/1995 | Walter et al. ............ 29/38 B |
| 5,682,658 | * | 11/1997 | Roselip ............ 29/48.5 A |
| 5,753,092 | * | 5/1998 | Hollars et al. ............ 29/563 X |
| 5,815,902 | * | 10/1998 | Osterried et al. ............ 29/563 X |

FOREIGN PATENT DOCUMENTS

| | | | |
|---|---|---|---|
| 38386 | * | 3/1977 | (JP) ............ 29/33 P |

OTHER PUBLICATIONS

Advertisement in American Machinist, Jan. 1998 for Rotary indexing tables, pp. 70 and 71.
Article in American Machinist, Feb. 1998 for Kirby CNC machine, p. 48.
Article in American Machinist, Dec. 1998, Machine of the month for Motch Corp, CNC verticle turning center.
Advertisement for Kingsbury Cyber–Cell II machine.
Advertisement for Giuliani USA, Inc. for rotary transfer machine.
Advertisement for Globetec International, Ltd. for rotary transfer machine.

* cited by examiner

*Primary Examiner*—William Briggs
(74) *Attorney, Agent, or Firm*—Leydig, Voit & Mayer, Ltd.

(57) ABSTRACT

A rotary transfer machine or rotary index table having an outer carriage ring subject to rotation about a central support frame. The rotary transfer machine includes a plurality of machining stations spaced at radial intervals about the carriage ring. The machining stations can provide outside machining stations on the outside of the carriage ring and inside machining stations mounted to the support frame inside of the carriage ring. The rotary transfer machine includes a plurality of pallets mounted around the carriage ring. Each pallet includes a clamp for holding workpieces to be machined therebetween. Each pallet includes a clearance opening which allows for cutting tools to extend through the pallets to machine the back side of the work piece and to allow for machining the work piece from all six sides. The rotary transfer machine also includes a drive control which includes a pair of servo motors drivingly connected to the carriage ring for rotating the carriage ring about the central frame, a position detector system including a scale mounted in a circle and an electronic detector for sensing the position of the scale and carriage ring, and an electronic controller responsive to the position detector system for selectively operating the servo motors to drive the carriage ring as well as operate the machine tools. The carriage ring is intermittently rotated about the central support frame to sequentially move workpieces through each of the machining stations. The pallets are mounted vertically between a pair of upper and lower ball bearing rings.

30 Claims, 17 Drawing Sheets

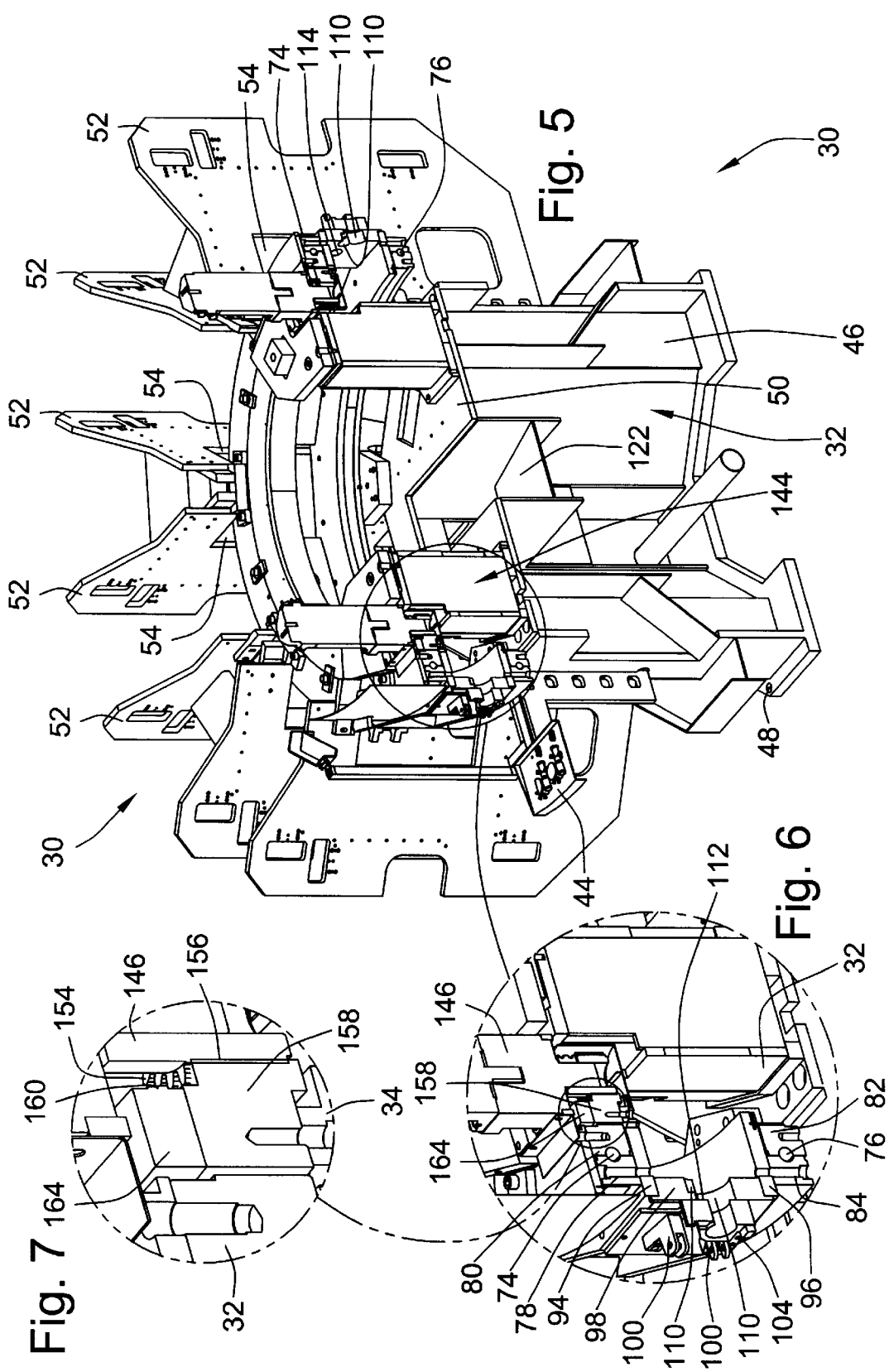

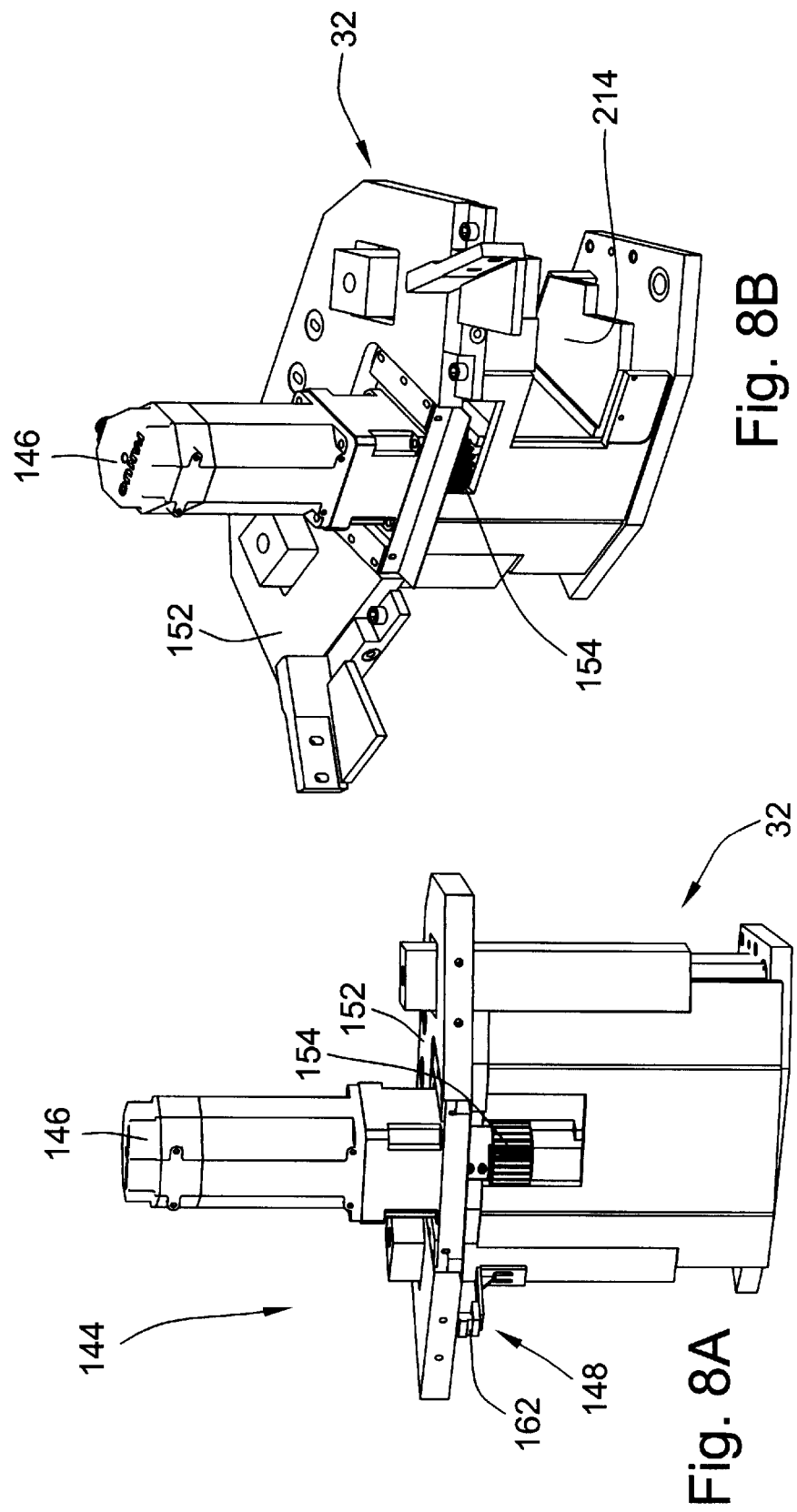

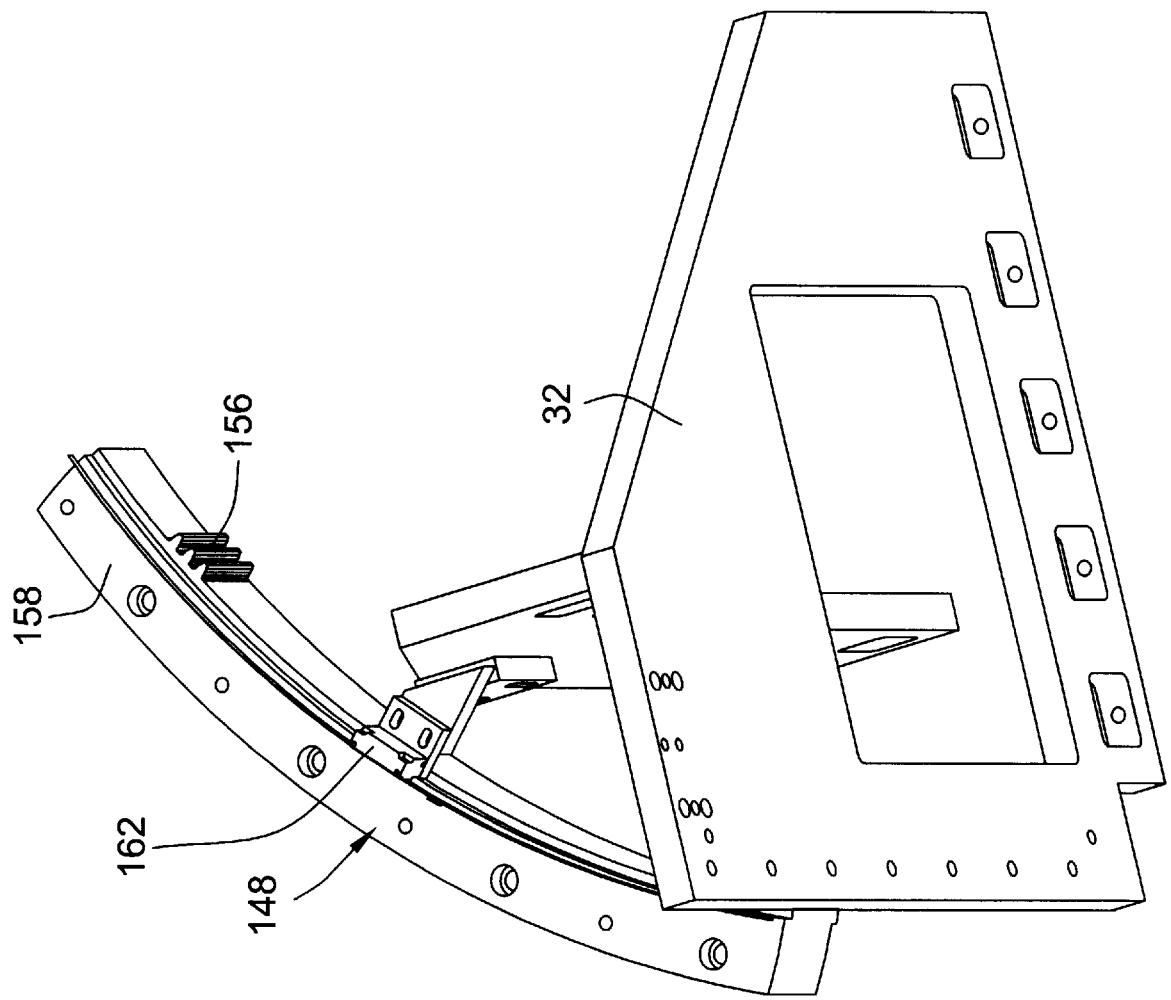

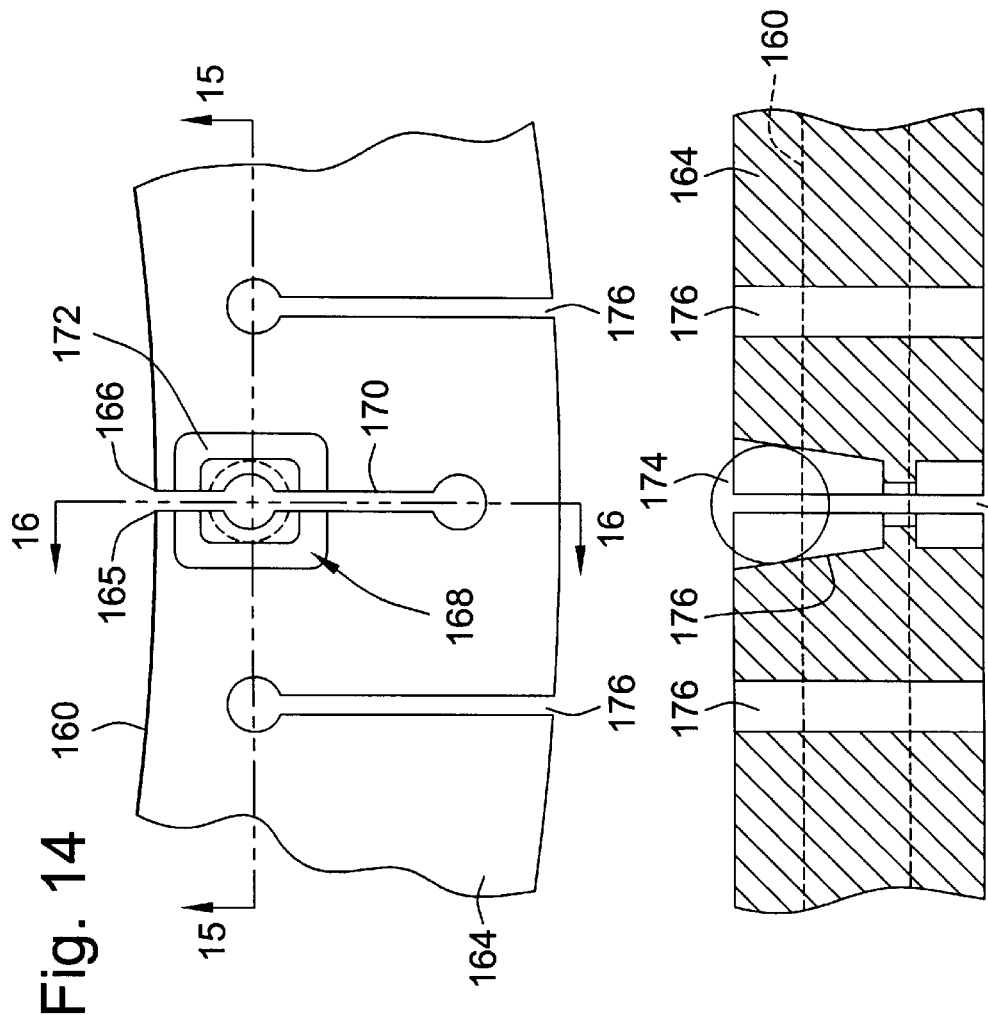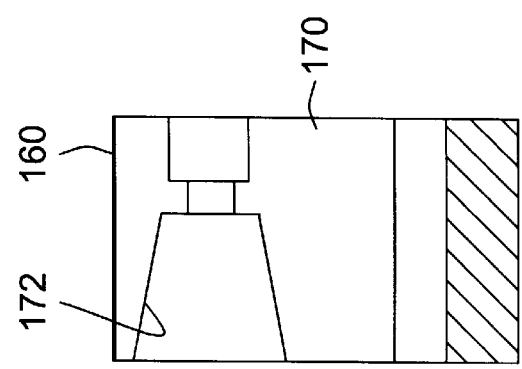

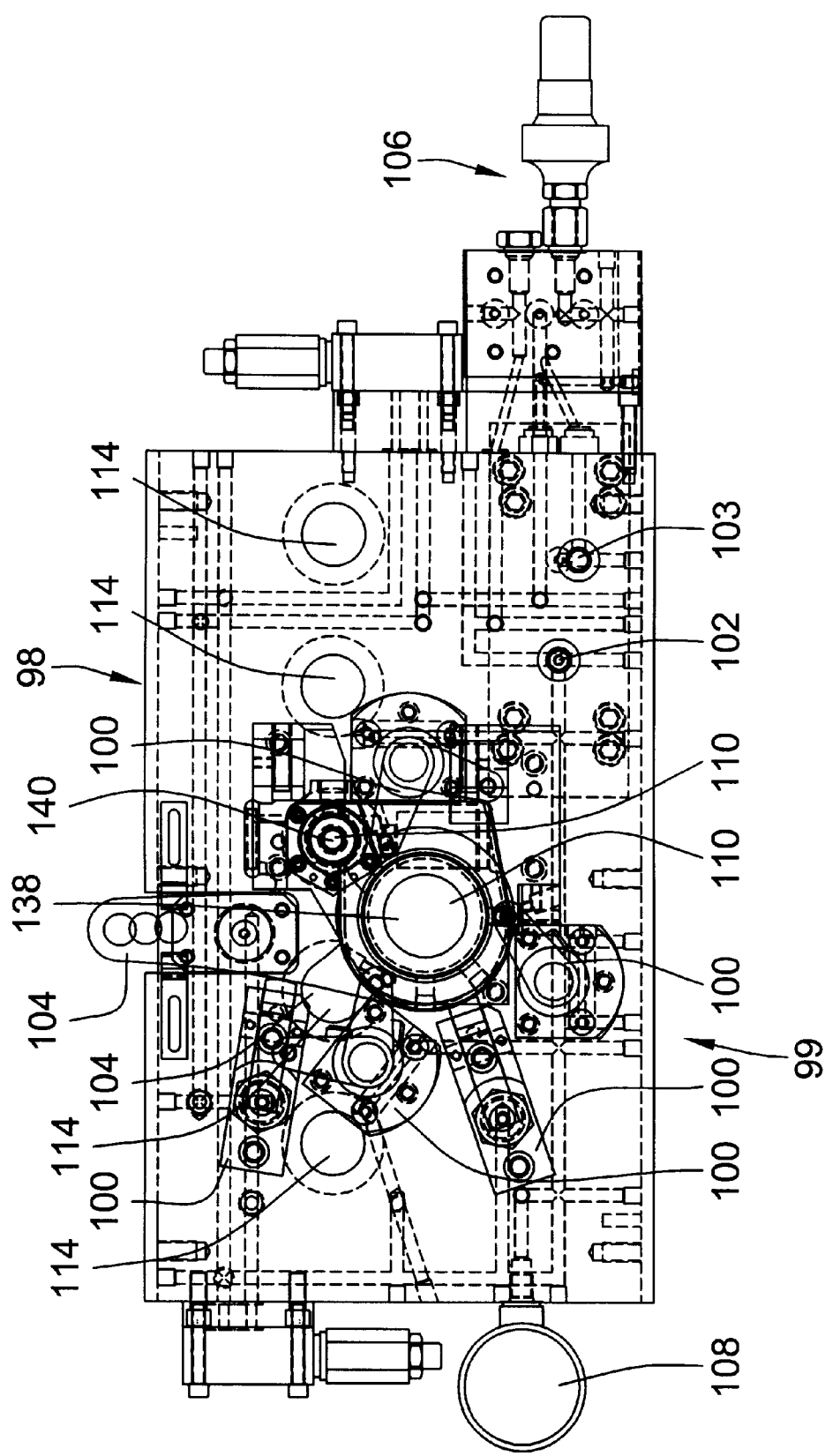

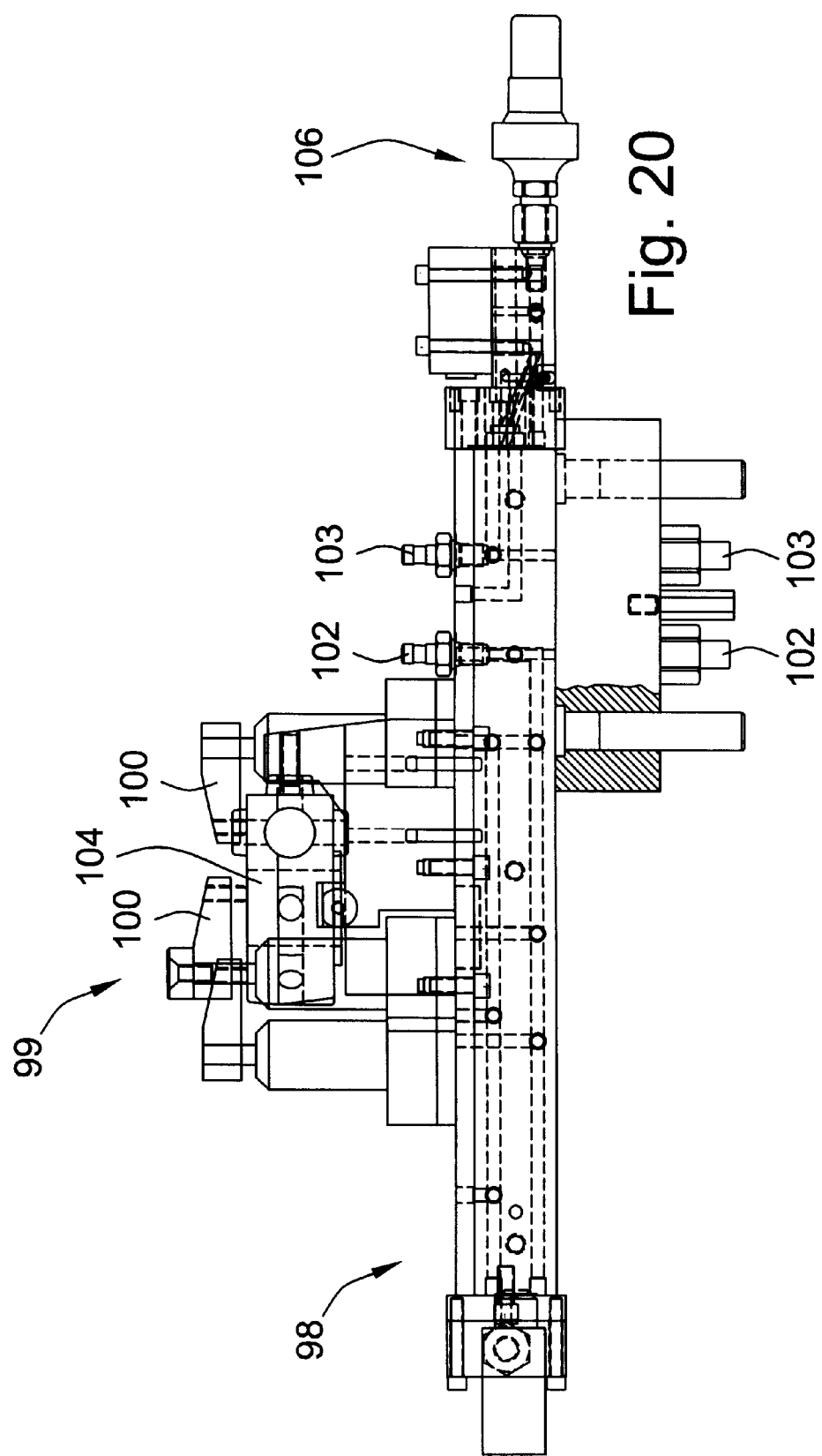

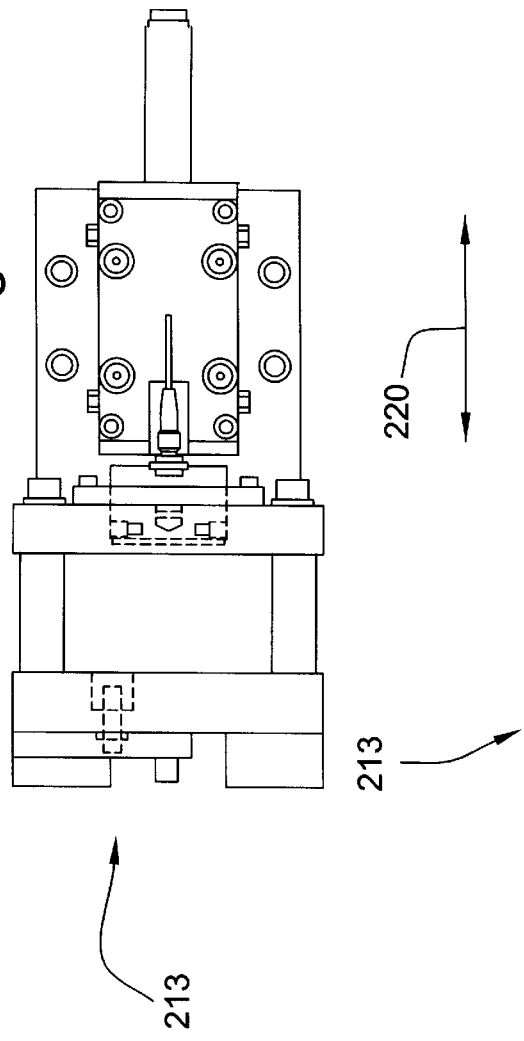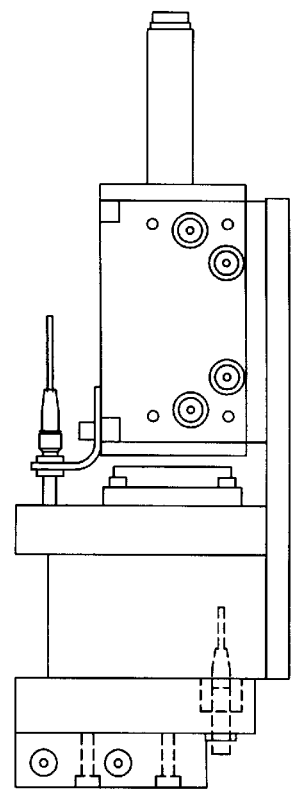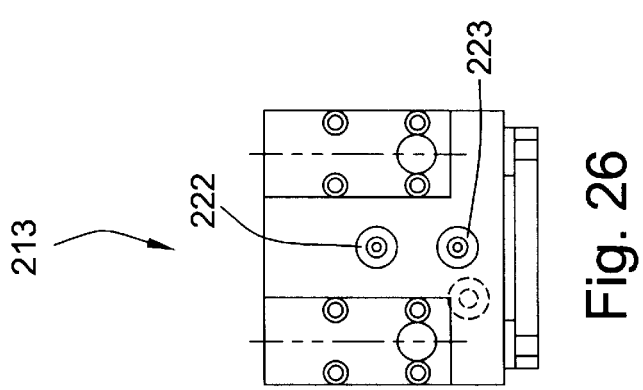
Fig. 25
Fig. 24
Fig. 26

ROTARY TRANSFER MACHINE

FIELD OF THE INVENTION

The present invention generally relates to machine tools and more particularly relates to rotary transfer machines having multiple machine tools.

BACKGROUND OF THE INVENTION

Rotary transfer machines are best known for high volume, mass production where multiple machining operations are necessary to complete a part or workpiece. An exemplary use of rotary transfer machines is to machine close tolerances into die cast workpieces. Rotary transfer machines typically rotate and index workpieces from station to station via a rotary index table mounted in the center of the stations. A drive control, typically a geneva drive mechanism or a two face gear coupling, performs intermittent indexing and rotating of the index table to cycle the workpieces sequentially through the stations. Various operations can be performed at each machining station as desired, including but not limited to milling, drilling, cross drilling, boring, internal and external recessing, threading, tapping, broaching and other machining operations.

The rotary index table typically has mounted thereon several clamping pallets that hold workpieces in position. The machine tools may drive a spindle radially inward into the workpiece towards the center of the table, or may work vertically above the workpiece, or may work at an angle therebetween. The clamping pallets may either be fixed relative to the rotary index table or capable of being rotated, tilted or otherwise moved relative to the rotary index table by mounting the pallets on satellite tables that are rotatable relative to the index table. By rotating the satellite table, more sides of the workpiece are exposed to allow for machining of more sides of the workpiece. It is much less desirable to move or rotate the workpiece relative to the index table once it is locked into position for a variety of reasons. One reason is that doing so decreases the tolerances between different machining operations performed at different stations because there are two different axes of rotation which allows for slop between rotational axes. Another reason is that cycle time is increased which results in an inefficiency reducing the production rate of the rotary transfer machine. Yet another reason is the high cost associated with providing the satellite tables and appropriate drive and positioning means for selectively positioning each of the satellite tables.

Utilizing such means as satellite tables on the rotary index table or other such carriage, prior rotary transfer machines have achieved a maximum of five sides of machining. However, it may be necessary to machine the sixth side of the workpiece which requires unclamping and reclamping the workpiece into another machine tool for machining. Not only does this further decrease the precision between machined holes, surfaces, grooves and the like, but it is also labor intensive as more workers are needed for the multiple unloading and loading operations and for operating separate machines. This is costly and time consuming. This also reduces the production rate and disadvantageous from both a fixed and variable cost perspective as additional space, clamping assemblies and machine tooling is necessary for machining the sixth side.

The drive controls of prior rotary transfer machines have also been less than satisfactory. Two face gear couplings require raising and lowering the table each time the table is rotated and indexed to the next station. Two face gear couplings therefore undesirably require a complex range movements in multiple directions which is also time consuming and results in an increase in the time necessary for the index cycle and therefore a decrease in production rates. Geneva drive mechanisms typically operate at fixed speed which undesirably causes low transfer speeds of workpieces from station to station which results in a relatively long indexing cycle. This limits the rate at which workpieces can be machined by the rotary transfer machine. Geneva drive mechanisms have also been known to have problems achieving precise positioning of the index table necessary for machining close tolerances into the work pieces. One such problem is that Geneva drive mechanisms use a stop pin for locating the index table. Stop pins are subject to wear and therefore cause misalignments in the index table over time.

SUMMARY OF THE INVENTION

It is the general aim of the present invention to provide a more practical rotary transfer machine than that of the prior art.

It is an objective to provide a rotary transfer machine that can increase precision between machining operations of a work piece.

It is another objective of the present invention to provide a rotary transfer machine that can reduce the fixed costs and labor costs of operating the machine and producing mass produced parts.

It is a specific objective according to one of the aspects of the present invention to provide a rotary transfer machine that is capable of machining all six sides of a workpiece if so desired.

According to one aspect, the present invention is directed in part towards a rotary transfer machine that can provide for inside and outside machine tools. According to this aspect, a rotary transfer machine for machining workpieces includes a stationary support frame carrying a carriage ring that is subject to rotation relative to the support frame. A plurality of pallets, each having a clamp for holding workpieces, are mounted on the carriage ring. The rotary transfer machine further includes at least one inner machine tool fixed to the support frame inside of the carriage ring and at least one outer machine tool fixed relative to the stationary support frame outside of the carriage ring. Each machine tool has a spindle adapted to hold and work a tool in an operative machining position with respect to the carriage ring. The rotary transfer machine also includes a drive control for the carriage for indexing the pallets into operative machining positions for each of the machining tools.

According to another aspect, the present invention is directed in part towards a rotary transfer machine for machining workpieces that mounts pallets for holding workpieces vertically between two bearing rings for more direct transfer of radial and axial loads resulting from machining operations. According to this aspect, a rotary transfer machine for machining workpieces includes a stationary support frame carrying a carriage that is subject to rotation relative to the support frame. The rotary transfer machine further includes upper and lower bearing rings supporting the carriage. The upper bearing ring is located vertically above the lower bearing ring. Each bearing ring has an inner race secured to the frame and an outer race secured to the carriage. The pallets, each having a clamp for holding workpieces, are mounted on carriage vertically between upper and lower bearing rings for support thereby and to transfer axial and radial loads resulting from machining operations to the support frame. A plurality of machining stations are located radially about the carriage and are fixed relative to the support frame. Each machining station including at least one machine tool having a spindle adapted to hold and work a tool in an operative machining position with respect to the pallets on the carriage. The rotary transfer machine also includes a drive control for the carriage for indexing the pallets into operative machining positions for each of the machining tools.

According to another aspect, the present invention is directed in part towards a rotary transfer machine that is capable of machining all six sides of a workpiece without unclamping the workpiece. According to this aspect, a rotary transfer machine for machining workpieces includes a stationary support frame carrying a carriage that is subject to rotation relative to the support frame. A plurality of pallets are mounted on the carriage. Each pallet includes a clamp for holding a workpiece and at least one clearance opening for receiving a cutting tool. A plurality of machining stations are located radially about the stationary frame and fixed relative to the frame. The machining stations provide a plurality of machine tools for machining the workpieces from a plurality of sides. Each machine tool has a spindle adapted to hold and work a tool in an operative machining position with respect to the carriage. At least one of the machine tools drives its cutting tool through the clearance opening in the pallet to machine the side of the workpiece facing the pallet. The rotary transfer machine also includes a drive control for the carriage for indexing the pallets into operative machining positions for each of the machining tools.

According to yet another aspect, the present invention is directed in part towards an improved drive control for a rotary transfer machine. According to this aspect, a rotary transfer machine for machining workpieces includes a stationary support frame carrying a carriage ring that is subject to rotation relative to the support frame. A plurality of pallets, each having a clamp for holding workpieces, are mounted on the carriage. The rotary transfer machine further includes at least one servo actuator supported by the central frame drivingly connected the carriage for driving the carriage relative to the frame. The rotary transfer machine also includes a position detector system having a scale arranged in a circle and an electronic detector in sensory communication with the scale. The scale and electronic detector are alternatively secured to the support frame and the carriage such that one rotates with the carriage and one is fixed to the support frame. The detector reads the scale to provide position feedback indicating the rotational position of the carriage relative to the frame. An electronic controller is provided in electrical communication with the machining stations, the position detector and the at least one servo actuator. The electronic controller responds to the position feedback to the selectively actuate the servo actuators and index the pallets sequentially through each of the machining stations, sequentially placing the pallets into operative machining positions for each of the machining tools.

These and other aims, objectives, and features of the invention will become more apparent from the following detailed description when taken in conjunction with the accompanying drawings.

BRIEF DESCRIPTION OF THE DRAWINGS

FIG. 5 is a perspective cross-sectional view of the rotary transfer machine illustrated in FIG. 1 with the machine tools at the various machining stations omitted.

FIG. 6 is an exploded view of a portion of FIG. 5.

FIG. 7 is an exploded view of a portion of FIG. 6.

FIGS. 8A and 8B are perspective views of the servo motor and support assembly used therefore in the rotary transfer machine of FIG. 1.

FIG. 9 is a view of certain parts including part of the gear ring and part of the detector system of the rotary transfer machine illustrated in FIG. 1.

FIG. 14 is an exploded fragmentary view of a portion of FIG. 13.

FIGS. 15 and 16 are cross-sectional views of FIG. 14 taken about 15—15 and 16—16, respectively.

FIG. 17 is a plan view of a pallet used on the rotary transfer machine holding a workpiece thereon.

FIG. 20 is a side view of FIG. 17.

FIGS. 24–26 are side, top and end views of an exemplary hydraulic coupler.

Figure 1:
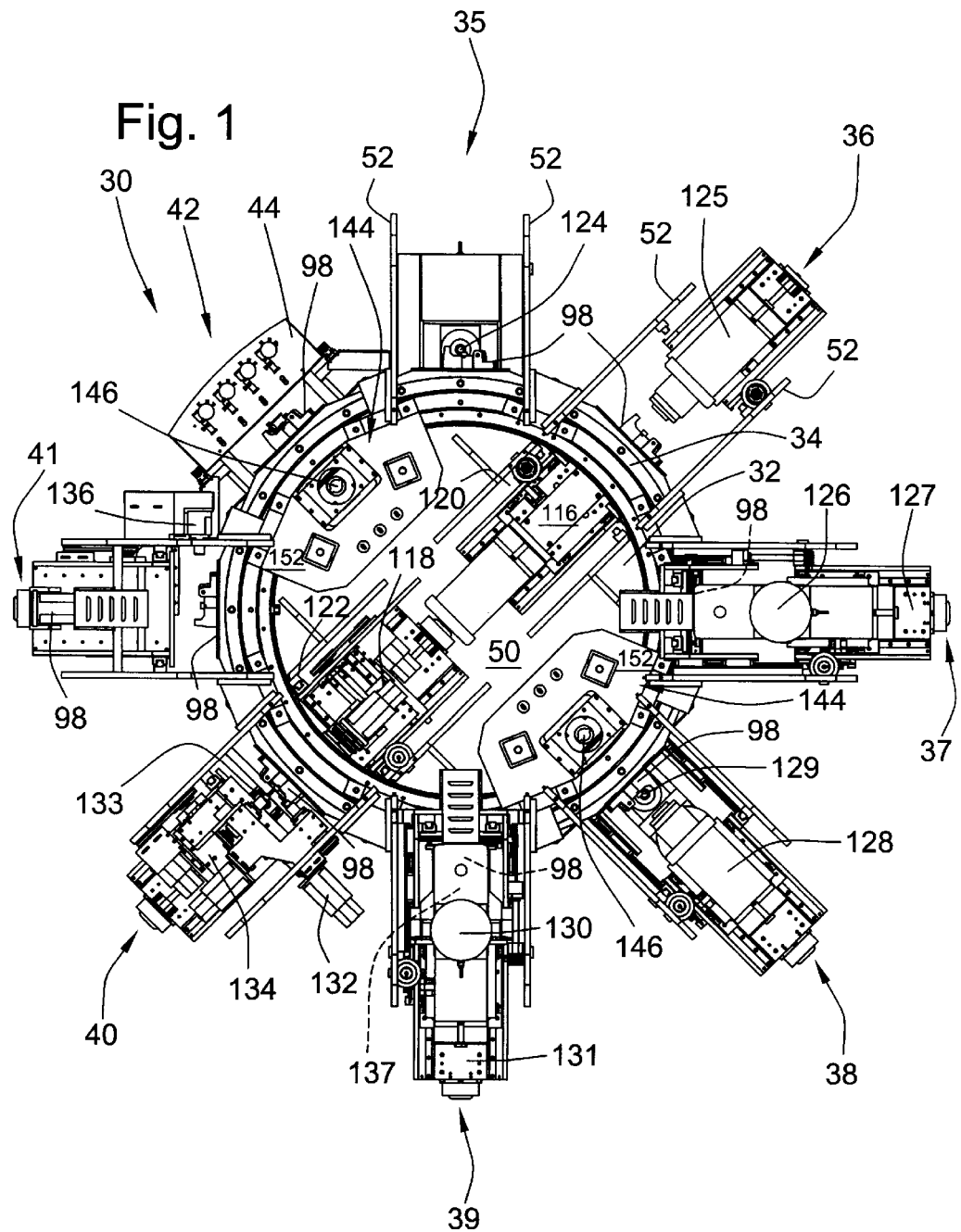
FIG. 1 is a plan view of a rotary transfer machine illustrating all stations of the rotary transfer machine, in accordance with a preferred embodiment of the present invention.
Figure 2:
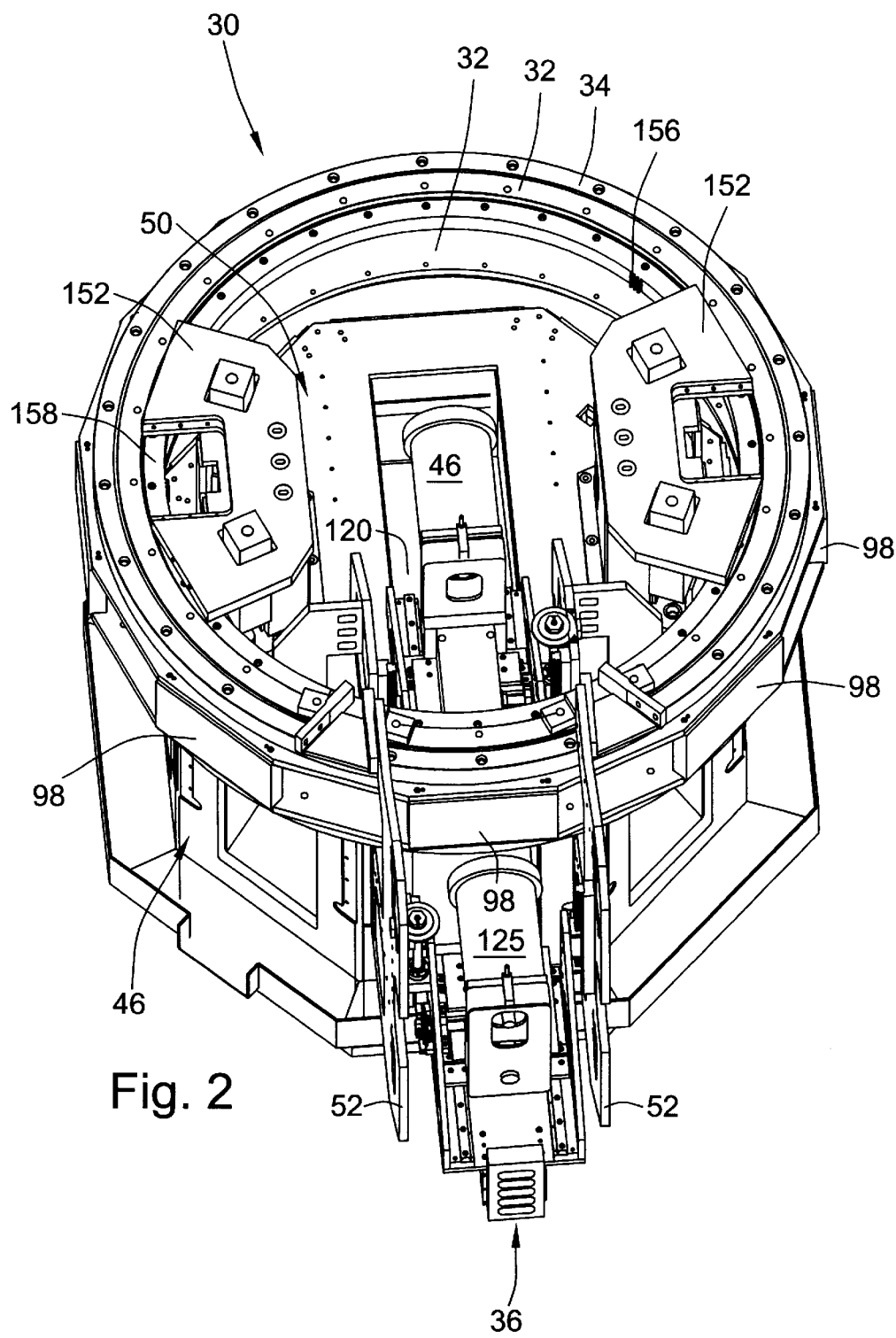
FIG. 2 is a perspective view of the rotary transfer machine shown in FIG. 1 with certain parts omitted, showing the second machining station in further detail.
Figure 3:
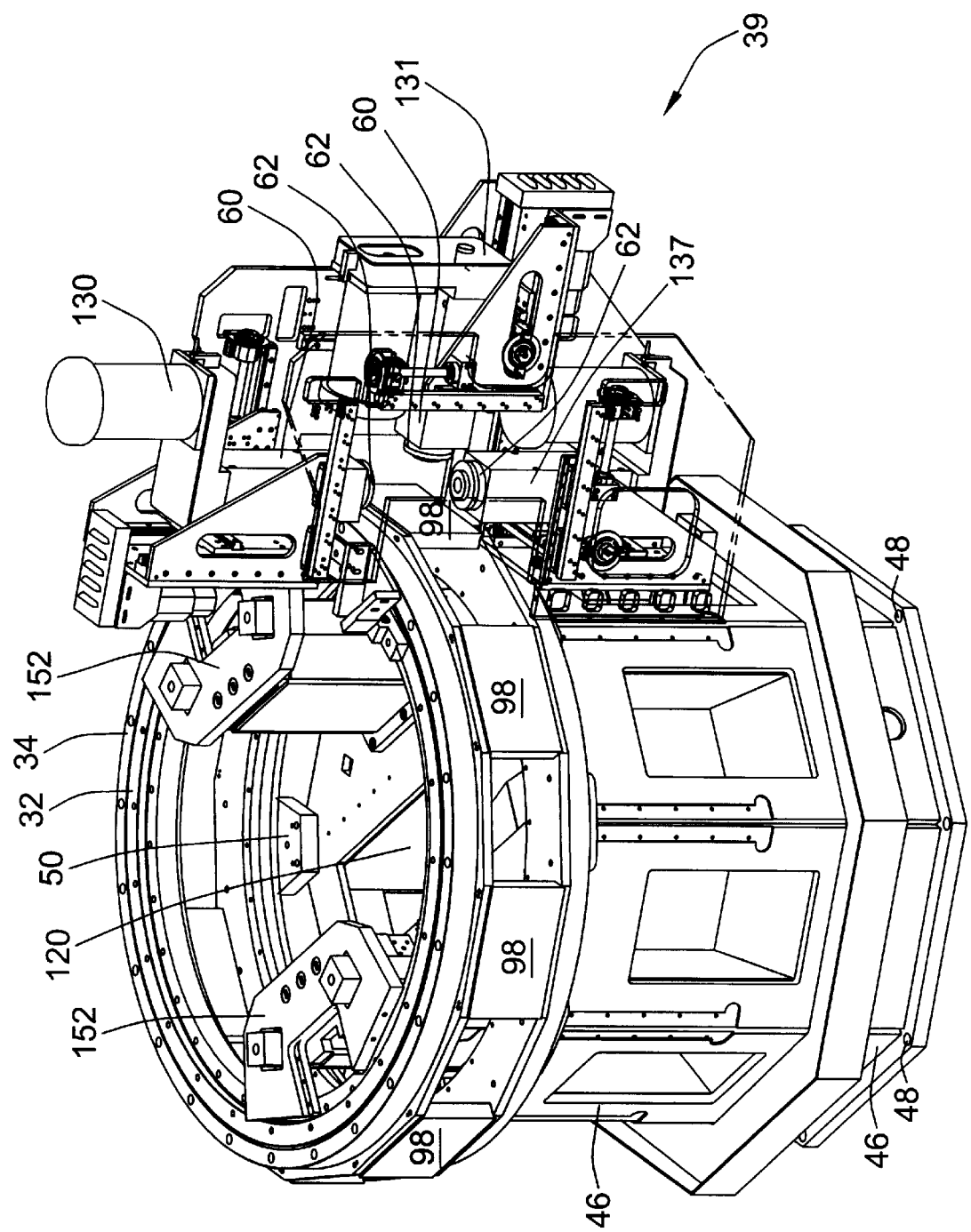
FIG. 3 is a perspective view of the rotary transfer machine shown in FIG. 1 with certain parts being omitted, showing the fifth machining station in greater detail.
Figure 4:
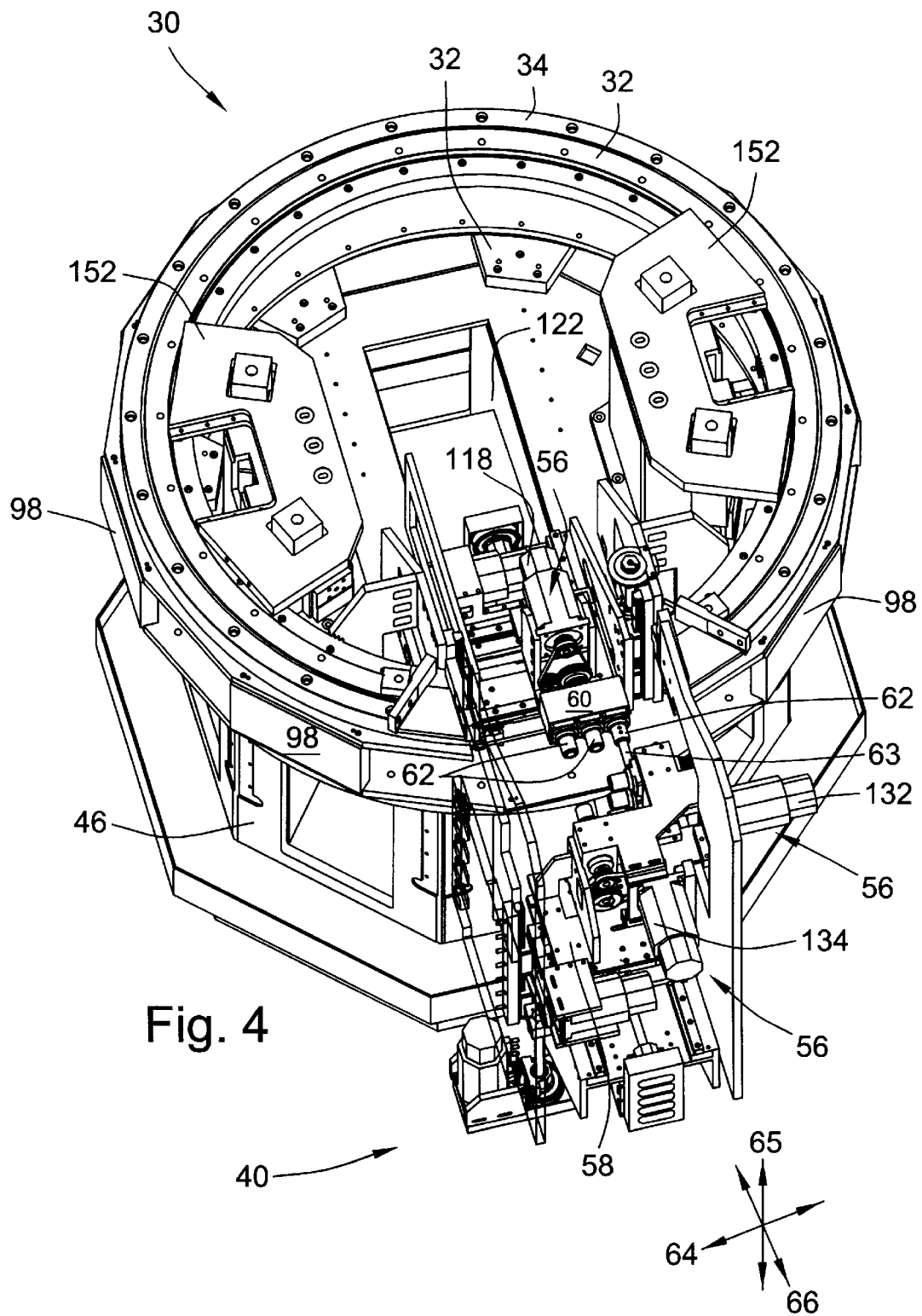
FIG. 4 is a perspective view of the rotary transfer machine shown in FIG. 1 with certain parts being omitted, illustrating the sixth machining station in greater detail.
Figure 10:
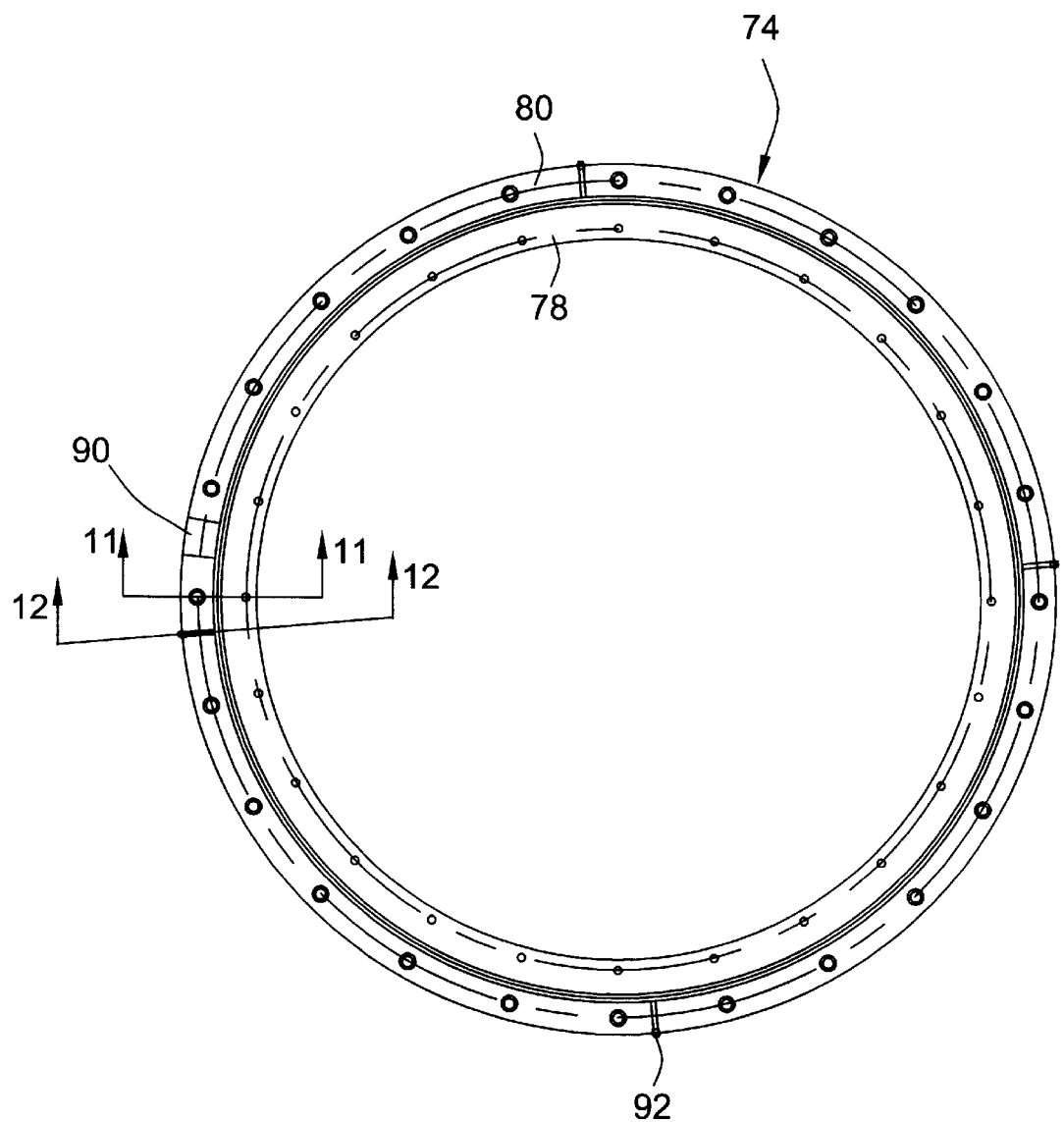
FIG. 10 is a plan view of the bearing ring used for the upper and lower bearing rings of the rotary transfer machine illustrated in FIG. 1.
Figure 11:
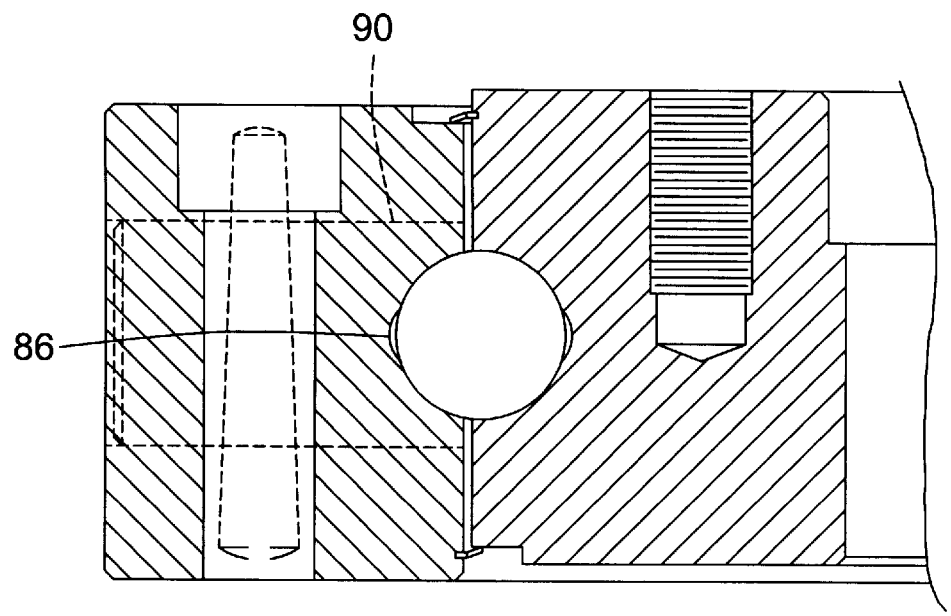
FIGS. 11 and 12 are cross-sectional view of FIG. 10 taken about lines 11—11 and 12—12, respectively.
Figure 12:
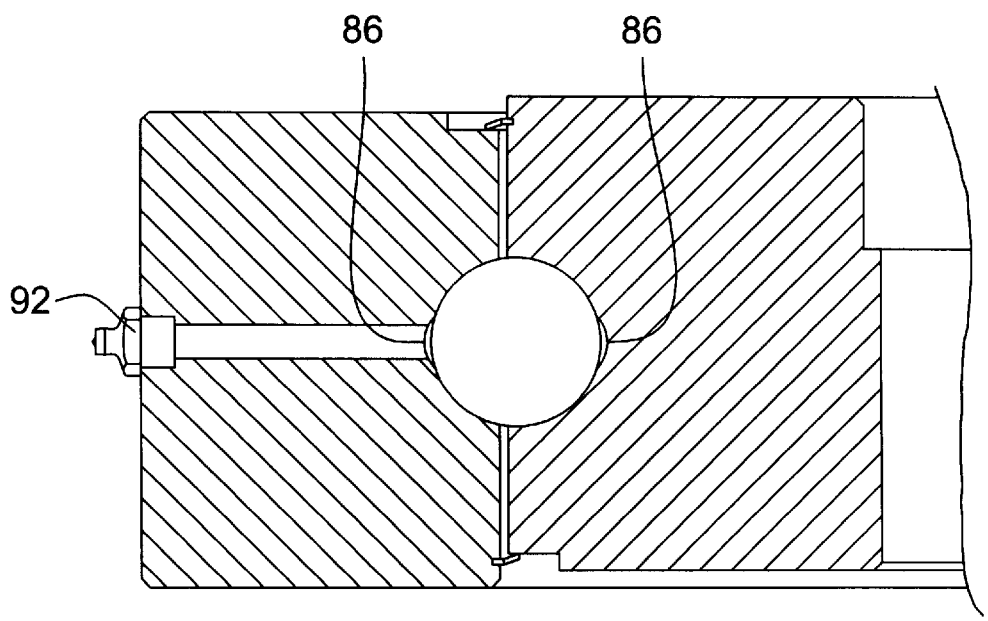
Figure 13:
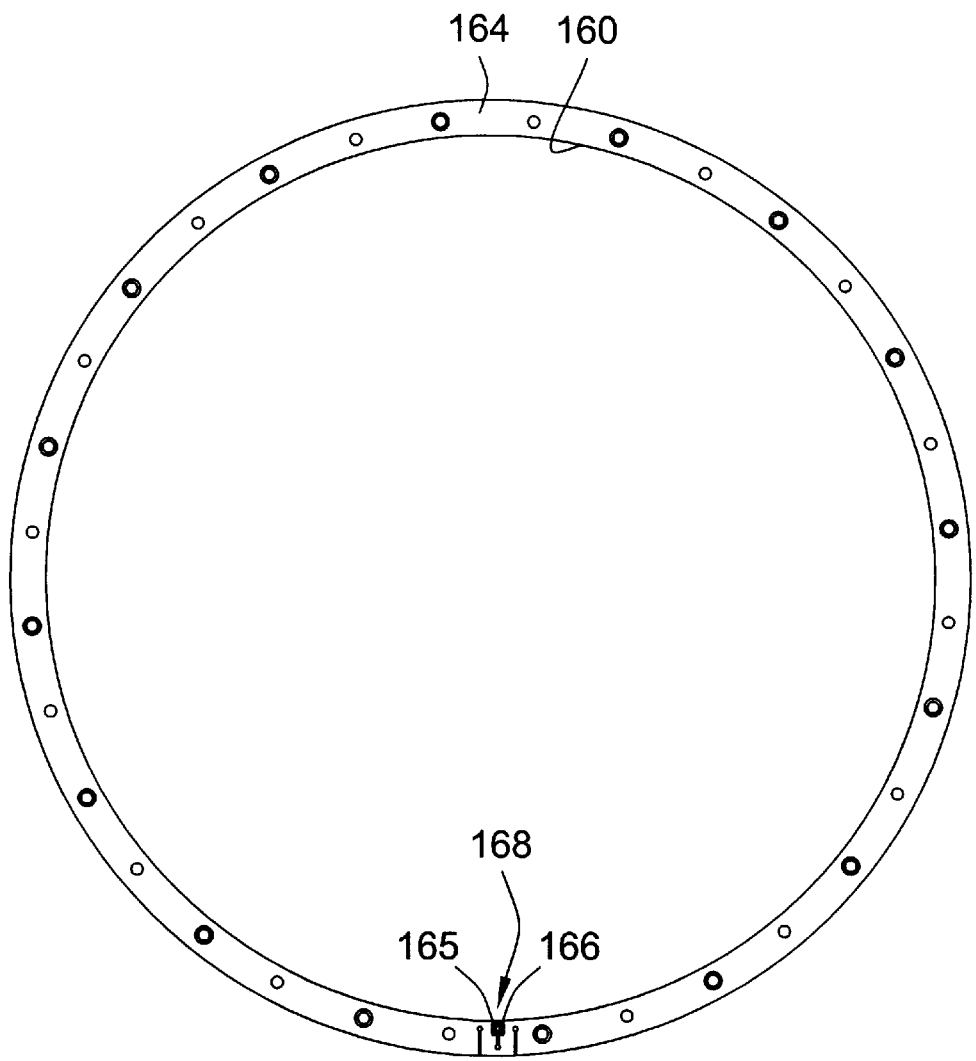
FIG. 13 is a plan view of a sensor ring that is mounted onto the gear ring that is shown partly in FIG. 9 for the rotary transfer machine of FIG. 1.
Figure 18:
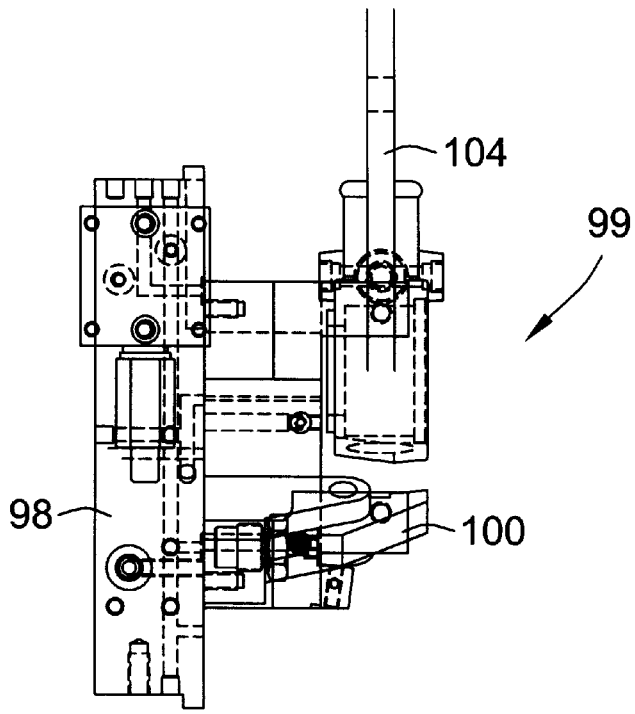
FIGS. 18 and 19 are end views of FIG. 17.
Figure 19:
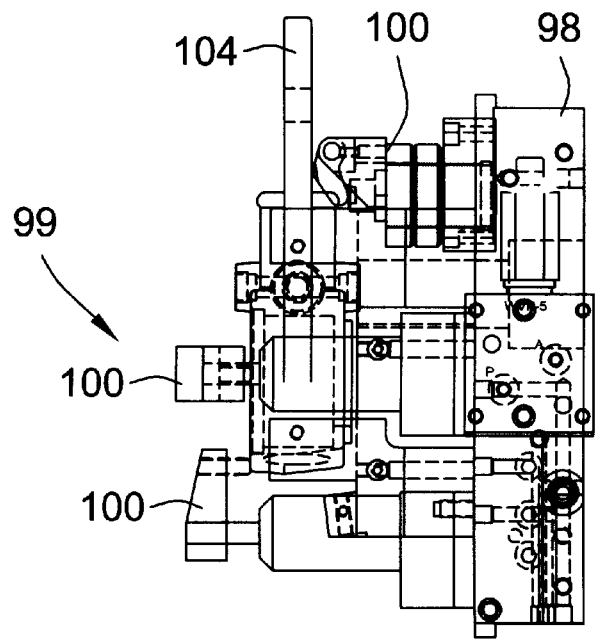
Figure 22:
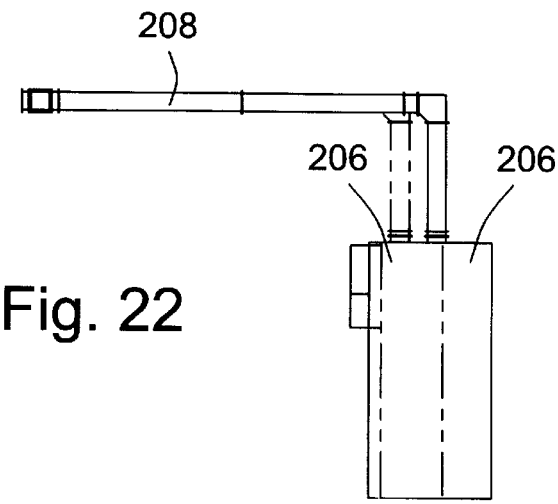
FIG. 22 is a side view of an electrical cabinet illustrated in FIG. 21.
Figure 21:
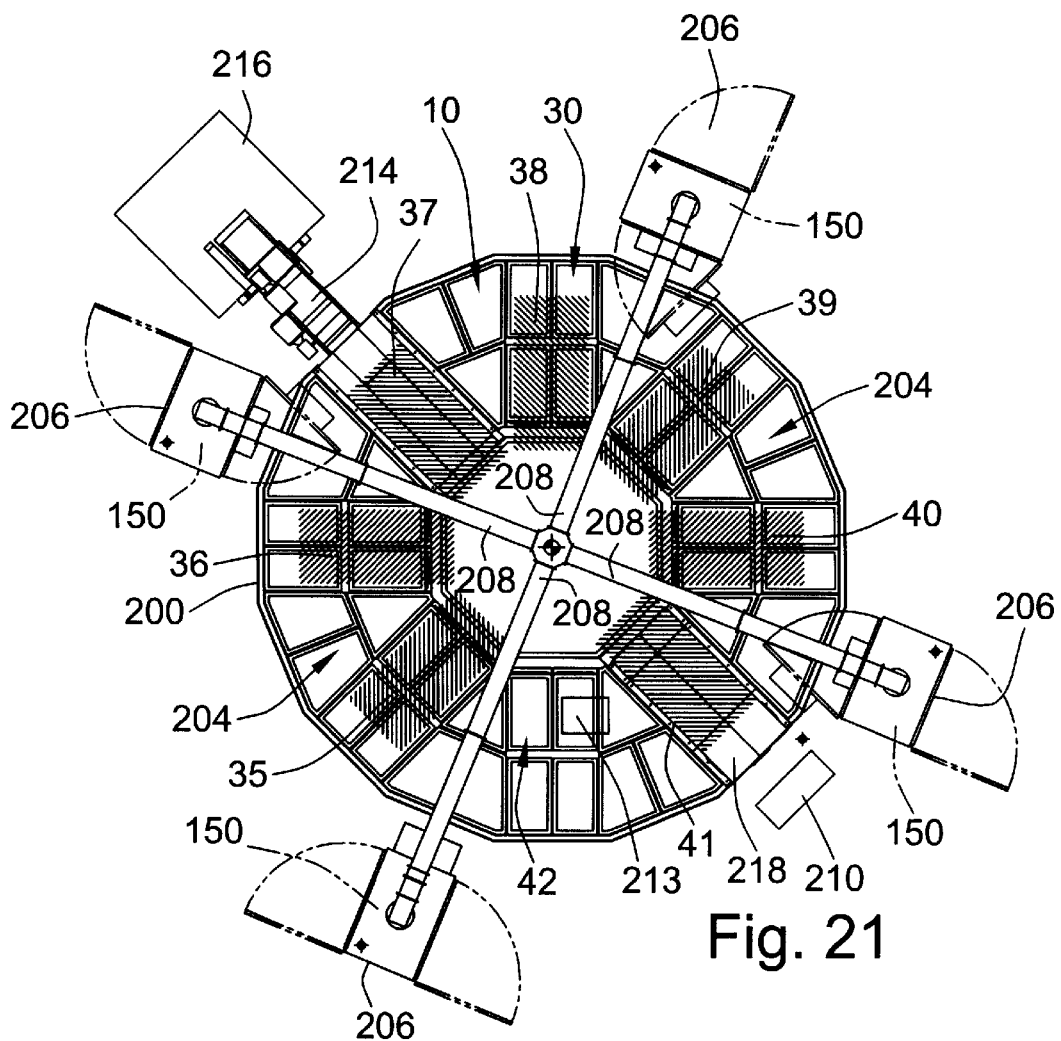
FIG. 21 is a partially schematic floor plan of associated rotary transfer machine components not shown in FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring to FIG. 1, a rotary transfer machine 30 is illustrated in accordance with a preferred embodiment of the present invention. The rotary transfer machine 30 generally includes a stationary support frame 32 and a carriage in the form of a carriage ring 34 subject to rotation about the support frame 32 around a central axis. A plurality of machining stations 35–41, in this case seven machining stations, are arranged generally at spaced radial intervals about the support frame 32. As will be explained in further detail below, the carriage ring 34 is adapted to be rotated and stopped at each station to index the carriage ring 34 and therefore cycle the workpieces sequentially through the machining stations 35–41. The number of machining stations can be adapted as desired to meet the machining requirements of the particular application. Between the first and last machining stations 35, 41, there is provided an operator station 42 which includes a control panel 44 for selectively controlling the operation of the machine 30. The operator station 42 is sized sufficiently large to allow at least one worker to load and unload workpieces on and off the rotary transfer machine 20.

Referring to FIGS. 2–5, the support frame 32 generally includes a support base 46 including a support column that may be secured to the floor by a hold down and leveling mechanism through threaded holes 48, an inner table assembly 50 mounted on the support base 46 inside of the carriage ring 34 and a plurality of mounting plates 52 extending radially outward of the carriage ring 34. The mounting plates 52 are also supported by the support base 46, having their upper end mounted to the inner table assembly 50 and their lower end mounted directly to the support base 46. In the embodied rotary transfer machine 30, two mounting plates 52 are mounted in spaced apart parallel relationship for mounting a machine tool therebetween. The mounting plates 52 also have a central recess 54 around the carriage ring 34 to accommodate movement of the carriage ring 34 and workpieces therethrough.

Each machining station 35–41 includes at least one machine tool 56 for machining a workpiece from at least one side. Details of exemplary machine tools 56 can be had with reference to FIG. 4. Preferably, multiple machine tools 56 are provided at each station for simultaneously machining the workpiece at that station from multiple sides. The type of machine tools 56 at the stations are selected for the desired machining operations at the station. Each machine tool 56 generally includes a housing 58 and a motor driven carriage head 60 supported by the housing 58 and having a spindle 62 adapted to hold and work a tool 63 (only one of the cutting tools being shown) for machining the workpieces. The carriage head 60 is driven along a machining axis which may be a single axis or alternatively multiple axes to machine workpieces. Preferably, the machine tools 56 are of the multiple axis type being capable of being adjusted or computerized numerical control (CNC) driven over mutually perpendicular X, Y, and Z axes 64–66, and also a tilt or rotational axis if so desired. The machine tools 56 are conventionally adjusted by screws for the respective X, Y, and Z axes 64–66 relative to each station separately. Each machine tool 56 can be adjusted by being locked by a control such as being computerized numeric control (CNC) driven or alternatively via a manual crank or dial mechanism (not shown). The advantage of providing CNC driven machines is that the spindle 62 may be driven in more than one axis to cut with the same cutting tool at different locations on the workpiece and/or to machine more complex multidirectional shapes into the workpiece and/or to machine at a tangent relative to the carriage ring 34 (see machine tool 136 for example). Another advantage is that different tool positions for each machine can also be input or stored and easily recalled to machine differently configured parts or different sizes of parts. The advantage of providing a manually adjusted dial mechanism (not shown) is the low fixed cost involved therewith.

The carriage ring 34 is supported by upper and lower bearing rings 74, 76. The upper bearing ring 74 has an inner race 78 secured to the support frame 32 and an outer race 80 secured to the carriage ring 34. Likewise, the lower bearing ring 76 has an inner race 82 secured to the support frame 32 and an outer race 84 secured to the carriage ring 34. Between the respective races 78–84 of each of the bearings 74, 76 is an annular channel 86 filled with bearing balls 88 that have been received through a loading plug 90. The balls are pre-stressed and in compression to prevent machining operations of the rotary transfer machine 30 from causing small displacements or misalignments that could otherwise result in reduced precision and tolerances. Each bearing ring 74, 76 also includes a plurality of grease fittings 92 at spaced radial locations for injecting grease into the channel 84 to provide for smooth translation between the respective races 78–84 of each of the bearings 74, 76. Other forms of bearing rings may also be used in the present invention including but not limited to roller bearings instead of ball bearings or alternatively a circular rail affixed to the support frame with slightly arc shaped linear bearings or roller packs mounted to the carriage.

The carriage ring 34 includes a pair of upper and lower disc members 94, 96 respectively fastened to the outer races 80, 84 of the upper and lower bearing rings 80, 82. A plurality of pallets 98 are mounted on the carriage ring 34 at spaced radial intervals and vertically between the disc members 94, 96 for holding workpieces. The pallets 98 shown in FIGS. 1–4, are shown without any details to prevent adding confusing detail into those drawings. For details of the pallets 98, reference should be made to FIGS. 5 and 17–20. As shown in FIGS. 17–20, each pallet 98 includes a hydraulically operated clamp 99 arranged thereon operatively connected via fluid passageways to hydraulic inputs 102, 103 for selectively and securely holding a workpiece 104. The hydraulically operated clamp 99 includes spring clips and clamping fingers, both generally indicated at 100 for holding the workpiece. The spring clips provide a holding force sufficiently strong enough to retain the workpiece but sufficiently weak enough allow a worker to overcome the force of the spring to remove the workpiece,. The clamping fingers are hydraulically operated for securely holding the workpiece for machining operations. A hydraulic signal through one of the first inputs 102 moves the clamping fingers 100 to securely hold the workpiece while a hydraulic signal through one of the second inputs 103 releases the clamping fingers 100. The pallet 98 may also include a hydraulic accumulator generally indicated at 106 for maintaining the hydraulic clamping force and a pressure gauge 108 for monitoring hydraulic pressure. Hydraulically operated clamps used in machine tooling are generally known to those skilled in the art and therefore the configuration and operation of the clamps will not be discussed in detail. Although each pallet preferably includes a hydraulically operated clamp 99, it will be appreciated to those of skill in the art that other types of clamps may also be used in the present invention. Thus, the term clamp as used herein including certain appended claims is intended to be indeed broad, including but not being limited to such other devices as a permanent magnet chuck, a manually operated end chuck, and other such clamp as appropriate or desired for the particular application.

In the preferred embodiment, each pallet 98 further includes two clearance openings 110, 111 between the clamps 100 for receiving respective cutting tools of a machine tool to allow for the face 112 of the workpiece 104 that faces the pallet 98 to be cut. The number and size of clearance openings can be selected as desired depending upon the machining requirements for the particular application. Each pallet 98 may also include outside openings 114 outside of the clamps 100 for receiving idle cutting tools while other cutting tools are machining the workpiece 104. The outside clearance openings 114 are aligned linearly with the second inside clearance opening 110.

In accordance with one of the aspects of the present invention, the rotary transfer machine 30 can provide for inside machining tools as well outside machine tools therefore providing for more sides of machining with less expensive machine tooling. The rotary transfer machine 30 of the preferred embodiment includes two inside machine tools 116, 118 located at the second and sixth stations 36, 40, respectively, mounted in pits 120, 122 in the inner table assembly 50 and to the inner table assembly 50 and support base 46. In addition to inside machine tools, the rotary transfer machine 30 also includes outside machine tools 124–136 located at the various machining stations 35–41. The outside machine tools 124–136 are supported by the support frame 32 mounted between the adjacent parallel mounting plates at each station. The outside machine tools designated at 124, 129, 133 and 137 are bottom side machine tools adapted to machine the bottom face of workpieces. The outside machine tools designated at 126 and 130 are top side machine tools adapted to machine the top face of workpieces. The outside machine tools designated at 132 and 136 are lateral side machine tools adapted to machine the two opposing lateral faces of workpieces tangential to the carriage 34. The outside machine tools designated at 125, 127, 131, 134, and 135 are radially outward machine tools adapted to machine the front face of workpieces. The number of inside and outside machine tools can be selected as desired such that there are either inside or outside machine tools at each station or both as desired for the particular application. Another advantage of providing inside machine tools is that a more compact rotary transfer machine can be provided in that the space radially inside the carriage is being efficiently used. It is another advantage that providing inside machining stations can also help to eliminate the need for expensive rotary satellite tables on the carriage.

In accordance with another aspect of the present invention, machining operations are performed by a cutting tool through the clearance openings 110, 111 between the clamps 100 of the pallet 98 to allow for machining the workpiece from all six sides. In the preferred embodiment, the inside machine tools 116, 118 operate respective spindles 62 through respective clearance openings 110, 111 to machine the back face 114 of the workpiece 114 facing the pallet 98, thereby achieving six sides of machining on the workpiece. It is an advantage that workpieces do not have to be unclamped and reclamped to machine the sixth side which achieves greater precision between machined holes, grooves and the like. At the second machining station 36, the inside machine tool 116 operates a cutting tool through the first clearance opening 110 to machine part of a first hole 138 in the workpiece 104. At the sixth machining station 40, the second inside machine tool 118 operates three spindles 62, holding and working respective tools in a sequence along the X axis 64 through the second inside clearance opening 118 for such exemplary operation as sequentially drilling, tapping and broaching a hole. The three spindles 62 of the second machine tool 118 are connected to the same head 60 meaning that they move in unison. The outside clearances openings 114 receive the cutting tools or spindles which are idle or not machining the workpiece.

It will also be understood to those skilled in the art that, depending upon the application, machining need not be performed on all six sides of the workpiece. It may be desirable for example to machine through clearance openings in the pallet to provide for a more convenient clamping arrangement or machine tool arrangement. However, it is an advantage that the present invention can eliminate the need for unclamping the workpiece and then reclamping the workpiece at a remote location for subsequent finishing machining operations. It is an advantage that this reduces labor costs associated with the clamping and unclamping workpieces as well as the labor required for operating a separate machine. This can also saves space as remote machining stations may no longer be necessary. It will also increase precision between machined holes, grooves and the like in the workpiece. It will also be understood to those skilled in the art that, depending upon how the pallets are mounted, other machine tools other than inside machine tools may drive the cutting tool through the clearance openings in the pallet. For example, if the pallets are mounted horizontally rather than vertically as shown in the figures of the preferred embodiment, then bottom machine tools can operate a cutting tool vertically through the clearance opening if so desired to machine the face of the workpiece facing the pallet.

The rotary transfer machine 30 also includes a drive control generally indicated at 144 for indexing the pallets 98 into an operative machining position for each of the machining tools. In the preferred embodiment, the ring carriage 34 is computerized numerical control (CNC) driven which can provide for faster workpiece transfer speeds between stations and greater accuracy and control in locating the ring carriage 34. The drive control 34 generally comprises at least one and preferably a pair of servo motors 146 as shown or other appropriate drive means, a position detector system 148 or other appropriate position feedback means, and an electronic controller 150 or other appropriate electronic control means. The servo motors 146 are mounted on respective shelf assemblies 152 that are secured to the support frame 32. The servo motors 146 are drivingly connected to the carriage ring 34 for driving the carriage ring 34 relative to the support frame 32. Each servo motor 146 drives a gear head 148 with an outer gear surface that closely meshes with a continuous inner gear surface 156 of a gear ring 158 that is secured to the carriage ring 34 or otherwise a part thereof, such that rotation of the gear head 148 imparts rotational motion to the carriage ring 34. The servo motors 146 can be selectively operated by the electronic controller 150 in unison to drive the carriage ring 34. Preferably, the speed of the servo motors 146 are controlled by the electronic controller 150 in a quick mode for more quickly indexing the carriage ring 34 and a slow mode for precisely locating the carriage ring 34. The servo motors 146 also provide a holding force to hold the position of the carriage ring 34 during machining operations by the machine tools 116, 118, and 124–136. Preferably, the servo motors 146 also integrally include a brake selectively operated by the operator at the control panel 44 through the electronic controller 150 for stopping the carriage ring 34 in the event of an emergency. Although one servo motor 146 would be sufficient, it is an advantage of two servo motors 146 that backlash in the rotary transfer machine 30 can be substantially or completely eliminated. In particular, the servo motors 146 can be driven in tandem to provide opposing forces on the gear ring 158 when the carriage ring 34 is stopped to prevent substantially all movement in the carriage ring 34 during machining operations.

The position detector system 148 provides feedback to the electronic controller 150 on the angular or rotational position of the carriage ring 34 relative to the support frame 32. The detector system 148 generally includes a scale 160 and an electronic detector 162 in sensory communication with the scale 160. A suitable detector system 148 that may be used with this invention is that sold under the trade name RG2 ENCODER SYSTEM, commercially available from the company RENISHAW, located in the United Kingdom. The scale 160 is secured to the carriage 34, and more specifically to a rigid sensor ring 164 which is in turn securely mounted on the gear ring 158 and therefore to the carriage 34. The scale 160 has an adhesive backing that is secured to the sensor ring 164 in a circle. The scale 160 includes fine linear increments that can be read by the electronic detector 162. The size of the circle is selectively large enough such that the scale can be easily read by the detector 162 without the slight arc in the scale 160 causing interference. Preferably, the scale 60 includes increments of about a 1 micron resolution which provides sufficient positioning of the pallets 98 at each of the stations to provide tight tolerances on the finished workpiece and also which allows the carriage ring 34 to move at more than about 1 meter per second, with a repeatability of plus or minus about a couple of microns.

The diameter of the sensor ring 164 is also slightly adjustable through small width slot 170 extending into the inner face of the sensor ring 164 where the scale 160 is secured and an adjustment mechanism 168. The ends 165, 166 intersect and meet at the control slot 170 such that the width of the control slot 170 controls the increment between the scale ends 165, 166. The distance between the scale ends 165, 166 is controlled to substantially match the increment between them to the adjacent increments along the entire scale 160. This also assists in keeping the precision of the rotary transfer machine 30 high. The adjustment mechanism 168 may include a tapered pocket 172 aligned with the control slot 170 and a wedge 174 selectively driven into the pocket 172 to control the width of the control slot 170. To prevent stresses in the carriage ring 34, relief slots 176 are place on the opposing sides of the control slot 170.

It will also be appreciated to those of skill in the art, that in less preferred embodiments of the present invention and according to certain other aspects of the present invention, the drive control could be provided by a Geneva drive mechanism, gear face coupling, hydraulic drive or other such mechanism for indexing workpieces from station to station.

Turning to FIGS. 25 and 26, a partly schematic floor plan is illustrated showing all of the associated components of the rotary transfer machine 30 of the preferred embodiment. One associated component is a coolant tank 200 disposed generally underneath the machining stations 35–41 for supplying each station with coolant for cooling the workpiece and removing chips during machining operations. A sturdy grate 202 is built over the coolant tank 200 to allow workers to walk on top of the coolant tank 200 and access the machining stations the access ways 204 for maintenance purposes. Metal chips or other waste materials are conveyed out of the tank 200 by a chip conveyer 214 to a chip storage bin 216. A coolant pump 218 is also connected to the coolant tank 200 at the end opposite the chip conveyor 214 for supplying coolant to the machining stations 35–41. Another component is the various electrical cabinets 206 storing various portions of the electrical controller 150 therein with the wiring being delivered to the control panel 44 and the machining stations 35–41 via overhead wiring conduits 208. A pneumatic drop 212 may be provided if desired.

Figure 23:
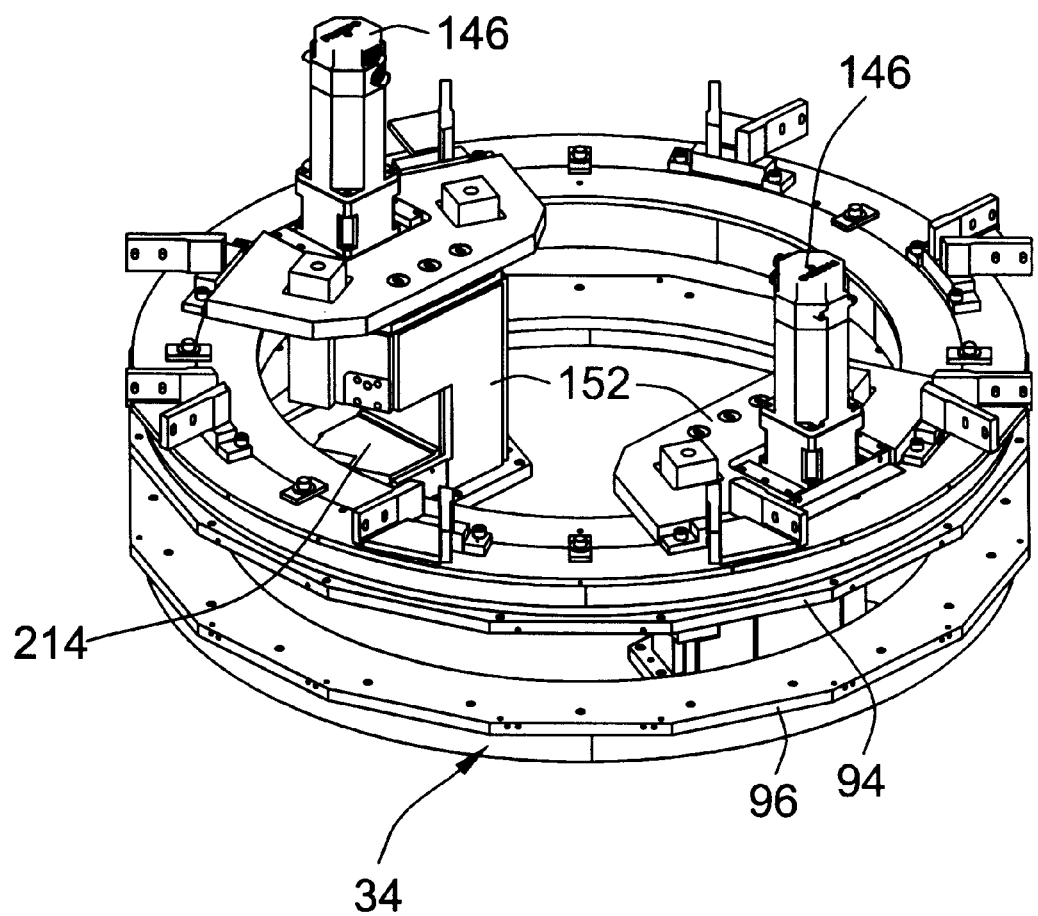
FIG. 23 is a perspective view of certain parts of the rotary transfer machine illustrated in FIG. 1.

A hydraulic pump unit 210 is also provided for operating a hydraulic coupler 213 connection to the pallets 98 for locking and automatically releasing the clamping fingers 100 once the carriage ring 34 stops locating the pallet 98 in front of the coupler 213. The hydraulic coupler 113 is mounted to the support frame 32 into a cavity 214 of the shelf assembly 152 (see FIGS. 8B and 23) for the servo motor 146 that is situated at the operator station 42. The hydraulic coupler 213 is also in electrical communication with the electronic controller 150. An example of a hydraulic coupler 113, which is commercially available from the company ENERPAC AUTOMATION SYSTEMS, is illustrated in FIGS. 24–26. As shown, the hydraulic coupler 113 is driven along a linear axis 220 for mating hydraulic outputs 222, 223 of the hydraulic coupler 113 with the respective hydraulic inputs 102, 103 of the pallets 98. The hydraulic coupler 113 is driven between the upper and lower bearing rings 74, 76 to reach the pallets 98.

In operation, at least one worker is located at the operator station 42 to operate the control panel 44 and load and unload workpieces. At the beginning of each cycle when the carriage ring 34 stops and the pallet exiting the last machining station 41 is now at the operator station 42, the hydraulic coupler 213 is driven into connection with the pallet 98 thereat, via a signal from the electronic controller 150, to automatically release the clamping fingers 100 such that the finished workpiece is retained by the spring clips 100. Then, the worker unloads the finished workpiece or part from the pallet 98 and then loads an unfinished workpiece or blank to the pallet 98 for entrance into the first station 35. During, this time, the machining stations 35–41 are performing machining operations. Once the machining operations are finished at each of the stations 35–41 as determined by the electronic controller 150 and the new workpiece is clamped to the pallet 98 at the operator station as indicated to the electronic controller 150 by a signal provided by the worker via the control panel 44, then each pallet 98 is indexed to the next adjacent machining station. In particular, the electronic controller 150 actuates the servo motors 146 controlling their acceleration and deceleration to position the pallets 98 at their next respective stations. With the preferred embodiment having eight total stations including the operator station 42, the carriage ring 34 is indexed one eighth of a circle until the workpiece is at the next station in an operative machining location as indicated by the position detector system 148. Once indicated, the electronic controller 150 stops the servo motors 146 and locks the carriage ring 34 in position. Once the carriage ring 34 is locked in position, the electronic controller 150 selectively signals the machine tools 125–136 to cause them to again machine the respective partly finished workpieces at their respective stations. Certain machine tools may be operated simultaneously while others are may be operated in sequence as desired. Also while the carriage ring 34 is locked, the operator is unloading and loading workpieces as previously indicated. These processes are cyclically repeated over and over again such that the carriage ring 34 is intermittently driven and rotated with respect to the support frame 32 to sequentially located each workpiece at each of the seven machining stations 35–41.

All of the references cited herein, including patents, patent applications and publications arc hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A rotary transfer machine for machining workpieces, comprising:
   a stationary support frame;
   a carriage ring carried by the support frame subject to rotation relative to the support frame;
   a plurality of pallets mounted vertically on the carriage ring, each pallet having a clamp for holding a workpiece and a clearance opening;
   at least one inner machine tool fixed to the support frame inside of the carriage ring and having a spindle adapted to hold and work a tool in an operative machining position with respect to the carriage ring, adapted to drive the tool through the clearance opening to machine the workpiece; and
   at least one outer machine tool fixed relative to the stationary support frame outside of the carriage ring, each outer machine tool having a spindle adapted to hold and work a tool in an operative machining position with respect to the carriage ring; and
   a drive control for the carriage for indexing the pallets into operative machining positions for each of the machining tools.

2. The rotary transfer machine of claim 1 wherein the support frame includes a support base supporting an inner table assembly inside the carriage ring and a plurality of mounting plates extending radially outward of the carriage ring, the mounting plates supporting the at least one outer machine tool.

3. A rotary transfer machine for machining workpieces, comprising:
   a stationary central support frame;
   a carriage ring carried by the frame, subject to rotation about the central support frame;
   upper and lower bearing rings supporting the carriage ring, the upper bearing ring located vertically above the lower bearing ring, each bearing ring having an inner race secured to the support frame and an outer race secured to the carriage ring;
   a plurality of pallets mounted on the carriage around the carriage at spaced intervals vertically between upper and lower rings, each pallet including a plurality of hydraulically operated clamping fingers on the radially outboard face thereof for holding a workpiece therebetween, and at least one clearance opening between the clamping fingers;
   a plurality of machining stations located radially about the stationary frame and fixed relative to the frame for machining the workpieces from a plurality of sides, the machining stations including at least one inner machine tool fixed to the central support frame inside of the outer ring carriage and driving a head radially outward, the head driving a spindle holding and rotating a cutting tool, the cutting tool being driven through the opening in the pallet to machine the side of the workpiece facing the pallet and at least one outer machine tool fixed to the stationary support frame outside of the outer ring carriage for driving a head radially inward, the head driving a spindle holding and rotating a cutting tool for machining the workpieces;
   at least one servo actuator supported by the central frame drivingly connected the carriage ring;
   a position detector system including a scale arranged in a circle and an electronic detector in sensory communication with the scale, the scale and the detector, one being secured to the support frame and the other being secured to the carriage, the detector reading increments on the scale to provide position feedback indicating the rotational position of the carriage relative to the frame; and
   an electronic controller in electrical communication with the machining stations, the position detector and the at least one servo actuator, the electronic controller responding to the position feedback to the selectively actuate the at least one servo actuators and index the pallets sequentially through each of the machining stations, sequentially placing the pallets into operative machining positions for each of the machining tools over an indexing cycle.

4. The rotary transfer machine of claim 3 further comprising a hydraulic coupler controlled by the electronic controller, supported by the frame inside the carriage and projecting between the bearing rings, the hydraulic coupler connecting to the pallet each time the carriage stops to automatically release the clamping fingers.

5. The rotary transfer machine of claim 1 wherein the drive control comprises:
   drive means for rotating the carriage ring about the support frame;
   position feedback means for indicating the position of the carriage ring relative to the support frame; and
   electronic control means responsive to the position feedback means for operating the drive means to rotate and stop the carriage ring to sequentially locate the pallets at each of the machine tools over an indexing cycle, and for selectively operating the machine tools when the carriage ring is stopped.

6. The rotary transfer machine of claim 1 wherein the machine tools are multi-axis machine tools, the position of the spindle capable of being adjusted in X, Y, and Z mutually perpendicular axes.

7. The rotary transfer machine of claim 1 wherein the pallets are rigidly mounted on the carriage ring and not movable with respect thereto.

8. The rotary transfer machine of claim 1 wherein the clamp of each pallet includes a plurality of hydraulically operated clamping fingers and a plurality of spring clips for holding a workpiece therebetween, and further comprising a hydraulic coupler supported by the frame inside the carriage ring, the hydraulic coupler connecting to the pallet each time the pallets are indexed to automatically release the clamping fingers for releasing the workpiece.

9. A rotary transfer machine for machining workpieces, comprising:
   a stationary support frame;
   a carriage carried by the support frame, subject to rotation relative to the support frame;
   upper and lower bearing rings mounted on the support frame and supporting the carriage to provide for smooth rotation between the carriage and the support frame, the upper bearing ring located vertically above the lower bearing ring;
   a plurality of pallets mounted on carriage vertically between upper and lower bearing rings, each pallet having a clamp for holding a workpiece;
   a plurality of machining stations located radially about the carriage and fixed relative to the support frame, each machining station including at least one machine tool having a spindle adapted to hold and work a tool in an operative machining position with respect to the carriage; and a drive control for the carriage for indexing the pallets into operative machining positions for each of the machining tools.

10. The rotary transfer machine of claim 9 wherein each bearing ring has an inner race secured to the support frame and an outer race secured to the carriage.

11. The rotary transfer machine of claim 9 wherein the clamp of each pallet includes a plurality of hydraulically operated clamping fingers and a plurality of spring clips for holding a workpiece therebetween, and further comprising a hydraulic coupler supported by the frame inside the carriage and projecting between the bearing rings, the hydraulic coupler connecting to the pallet each time the pallets are indexed to automatically release the clamping fingers for releasing the workpiece.

12. The rotary transfer machine of claim 9 wherein the plurality of machining stations includes at least one inner machine tool fixed to the support frame inside of the bearing rings and at least one outer machine tool fixed relative to the stationary support frame outside of the bearing rings.

13. The rotary transfer machine of claim 12 wherein each pallet defines a clearance opening, the at least one inner machine tool driving the cutting tool radially outward through the clearance opening to machine the side of the workpiece facing the pallet.

14. The rotary transfer machine of claim 9 wherein the drive control comprises:
  drive means for driving the carriage relative to the support frame;
  position feedback means for indicating the position of the carriage relative to the support frame; and
  electronic control means responsive to the position feedback means for operating the drive means to rotate and stop the carriage to sequentially locate the pallets at each of the different machining stations over an indexing cycle, and for selectively operating the machine tools when the carriage is stopped.

15. The rotary transfer machine of claim 9 wherein the pallets are rigidly mounted on the carriage and not movable with respect thereto.

16. A rotary transfer machine for machining workpieces, comprising:
  a stationary support frame;
  a carriage carried by the frame, subject to rotation relative to the frame;
  a plurality of pallets mounted on the carriage, each pallet including a clamp for holding a workpiece and at least one clearance opening;
  a plurality of machining stations located radially about the stationary frame and fixed relative to the frame providing a plurality of machine tools for machining the workpieces from a plurality of sides, each machine tool having a spindle adapted to hold and work a tool in an operative machining position with respect to the carriage, at least one of the machine tools driving the cutting tool through the at least one clearance opening in the pallet to machine the side of the workpiece facing the pallet; and
  a drive control for the carriage for indexing the pallets into operative machining positions for each of the machining tools.

17. The rotary transfer machine of claim 16 wherein the plurality of machining stations include at least six machine tools, each machine tool arranged to machine the workpiece from a respective side when positioned at the corresponding station, including one machine tool that machines through said clearance opening, such that workpieces are machined from all six sides without rotating the workpiece relative to the carriage and without unclamping the workpiece from the pallets.

18. The rotary transfer machine of claim 16 wherein the stationary support frame extends up through the middle of the carriage to support at least one inner machine tool that is fixed to the support frame inside of the carriage.

19. The rotary transfer machine of claim 16 wherein the pallets are mounted vertically such that workpieces project horizontally from the pallets.

20. The rotary transfer machine of claim 16 further comprising:
  drive means for driving the carriage relative to the support frame;
  position feedback means for indicating the position of the carriage relative to the support frame; and
  electronic control means responsive to the position feedback means for operating the drive means to rotate and stop the carriage to sequentially locate the pallets at each of the different machining stations over an indexing cycle, and for selectively operating the machine tools when the carriage is stopped.

21. The rotary transfer machine of claim 16 wherein the machine tool that works through the at least one clearance opening includes a plurality of spindles carried by a common head to move in unison and sequentially working respective tools through the at least one clearance opening, the pallet including a plurality of secondary openings aligned with the at least one clearance openings for receiving non-working tools of the plurality of spindles.

22. The rotary transfer machine of claim 16 wherein the clamp of each pallet includes a plurality of hydraulically operated clamping fingers and a plurality of spring clips for holding a workpiece therebetween, and further comprising a hydraulic coupler supported by the support frame, the hydraulic coupler connecting to the pallet each time the pallets are indexed to automatically release the clamping fingers for releasing the workpiece.

23. The rotary transfer machine of claim 22 wherein the at least one clearance opening is defined between clamping fingers.

24. A rotary transfer machine for machining workpieces, comprising:
  a stationary support frame;
  a carriage carried by the support frame, subject to rotation relative to the support frame;
  a plurality of pallets mounted radially on the carriage, each pallet having a clamp for holding workpieces;
  a plurality of machining stations located radially about the stationary frame and fixed relative to the frame, each machining station including at least one machine tool having a spindle adapted to hold and work a tool in an operative machining position with respect to the carriage;
  at least one servo actuator supported by the central frame driving the carriage;
  a position detector system including a scale arranged in a circle and an electronic detector in sensory communication with the scale, one being secured to the support frame and the other to the carriage, the detector reading increments on the scale to provide position feedback indicating the rotational position of the carriage relative to the frame; and
  an electronic controller in electrical communication with the machining stations, the position detector and the at least one servo actuator, the electronic controller responding to the position feedback to the selectively actuate the at least one servo actuator and index the pallets sequentially through each of the machining stations, sequentially placing the pallets into operative machining positions for each of the machining tools over an indexing cycle.

25. The rotary transfer machine of claim 24 wherein the electronic detector is secured to the support frame and the scale is secured to the carriage.

26. The rotary transfer machine of claim 25 further comprising a sensor ring mounted to the carriage having the scale secured thereto, wherein the sensor ring defines a radially extending slot, the scale including starting and terminating ends at the slot, the width of the slot being controlled to control the distance between the starting and terminating ends.

27. The rotary transfer machine of claim 26 wherein the sensor ring includes a tapered pocket connected to the slot and a wedge expanding and contracting the pocket to control the width of the slot to match the starting and terminating ends.

28. The rotary transfer machine of claim 24 wherein the stationary support frame extends up through the middle of the carriage to support at least one inner machine tool that is fixed to the support frame inside of the carriage.

29. The rotary transfer machine of claim 24 wherein the at least one servo motor comprises at least two servo motors each servo motor driving a gear which in turn driven a gear ring fixed to the carriage, the servo motors placing opposing biases on the gear ring carriage is stopped in order to prevent backlash in the carriage during machining operations.

30. The rotary transfer machine of claim 24 wherein the at least one servo motor integrally includes a brake selectively operated by the electronic controller.

\* \* \* \* \*

UNITED STATES PATENT AND TRADEMARK OFFICE
CERTIFICATE OF CORRECTION

PATENT NO. : 6,178,608 B1
DATED : January 30, 2001
INVENTOR(S) : Loyd L. Koch

Page 1 of 1

It is certified that error appears in the above-identified patent and that said Letters Patent is hereby corrected as shown below:

<u>Claim 3,</u>
Line 11, change "actuators" to "actuator"

Signed and Sealed this

Thirteenth Day of November, 2001

*Attest:*

*Nicholas P. Godici*

*Attesting Officer*

NICHOLAS P. GODICI
*Acting Director of the United States Patent and Trademark Office*